(12) United States Patent
Yui et al.

(10) Patent No.: US 10,717,243 B2
(45) Date of Patent: Jul. 21, 2020

(54) PREFORM MEMBER BONDING METHOD

(71) Applicant: MITSUBISHI AIRCRAFT CORPORATION, Aichi (JP)

(72) Inventors: Yuichi Yui, Tokyo (JP); Akihisa Okuda, Tokyo (JP); Hiromichi Akiyama, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 146 days.

(21) Appl. No.: 15/138,271

(22) Filed: Apr. 26, 2016

(65) Prior Publication Data

US 2016/0346973 A1  Dec. 1, 2016

(30) Foreign Application Priority Data

May 28, 2015 (JP) .................. 2015-108082

(51) Int. Cl.
  *B29C 70/48* (2006.01)
  *B29L 9/00* (2006.01)

(52) U.S. Cl.
  CPC ........... *B29C 70/48* (2013.01); *B29L 2009/00* (2013.01)

(58) Field of Classification Search
  CPC ......... B29C 70/48; B29C 70/00; B29C 70/28; B29C 70/40; B29C 70/46; B29C 70/44; B29C 70/54; B29L 2009/00; B29B 15/00; B29B 15/08; B29B 13/02; B29B 13/023; C09J 5/00; C09J 5/06; C09J 2205/306

USPC ......... 156/273.3, 306.9, 307.1, 307.3, 307.5, 156/307.7; 264/261
  See application file for complete search history.

(56) References Cited

U.S. PATENT DOCUMENTS

| 6,176,964 | B1 * | 1/2001 | Parente ................ G10K 11/172 156/306.9 |
| 6,228,500 | B1 * | 5/2001 | Hiroshige .............. C09J 163/00 361/748 |
| 6,676,798 | B1 * | 1/2004 | Murray .................... B32B 7/12 156/307.4 |
| 9,539,767 | B2 * | 1/2017 | Butler ................. B29C 35/0288 |
| 2004/0200571 | A1 * | 10/2004 | Yamaguchi ........... B29C 70/088 156/292 |
| 2007/0207323 | A1 * | 9/2007 | Maxwell .................. A45C 5/02 428/414 |

FOREIGN PATENT DOCUMENTS

JP    2003-011231    1/2003

* cited by examiner

*Primary Examiner* — Leith S Shafi
(74) *Attorney, Agent, or Firm* — Pearne & Gordon LLP

(57) ABSTRACT

Provided is a preform member bonding method of bonding a preform member and another member with an adhesive in an RTM process. The preform member bonding method includes increasing viscosity of the adhesive by heat-treating only the adhesive in advance before inserting the adhesive between bonding surfaces of the preform member and the other member.

3 Claims, 3 Drawing Sheets

PREFORM MEMBER BONDING METHOD

TECHNICAL FIELD

The present invention relates to a preform member bonding method in RTM (Resin Transfer Molding).

BACKGROUND ART

The RTM process is a molding method including: laying a workpiece made of composite material, such as reinforcing fiber base material (glass fiber, carbon fiber, or the like), on a mold; hermetically sealing a vacuum bag film or mold with the preform member placed therein; and injecting resin into the resultant vacuum bag film or mold through vacuum suction to impregnate the preform member with the resin. The use of the RTM process has an advantage which makes it possible to mold the composite material at low cost without a need of an expensive autoclave or the like.

There are cases where pre-heating is performed as a step of the RTM process. The pre-heating is to heat a preform member, making it easy for the preform member to be impregnated with resin.

CITATION LIST

Patent Literature(s)

{Patent Literature 1} Japanese Patent Application Publication No. 2003-11231

SUMMARY OF INVENTION

Technical Problem

Because of their shapes, some workpieces are hard to form as a unitary component from the beginning. In such cases, separately-produced members are bonded together to form a unitary component <for example, the above Patent Literature 1>. The RTM process bonds preform members together, or bonds a preform member and a workpiece which has been hardened (hereinafter referred to as a "hardened member") together, with an adhesive inserted between bonding surfaces of the respective members by heating them after resin impregnation.

There are cases where heating is performed before or during the resin impregnation in the RTM process. Once the workpiece including the adhesive is heated, the viscosity of the adhesive becomes lower as the temperature becomes higher. As a result, the adhesive is sucked into the preform member, and adheres to (the surfaces of) fiber strands in the preform member.

This resultant condition makes the resin impregnation unsuccessful because the resin will not enter the fiber strands to the surfaces of which the adhesive attaches, so that the preform member is not sufficiently impregnated with the resin. Thus, the strength of the workpiece decreases.

Against the background, an object of the present invention is to propose a preform member bonding method capable of preventing a preform member from not being impregnated with resin as a result of entry of an adhesive into the preform member in a workpiece, and concurrently preventing a decrease in bonding strength of the adhesive, as well as consequently securing strength of the workpiece, in a pre-heating step of the RTM process, that is to say, in a heating step before or during resin impregnation.

Solution to Problem

A first aspect of the invention to solve the above problem provides a preform member bonding method of bonding a preform member and another member with an adhesive in an RTM process, including increasing viscosity of the adhesive by heat-treating only the adhesive in advance before inserting the adhesive between bonding surfaces of the preform member and the other member.

A second aspect of the invention to solve the above problem provides the preform member bonding method according to the first aspect of the invention, in which the viscosity is beforehand increased so as not to become lower than a predetermined value.

Advantageous Effects of Invention

According to the preform member bonding method of the present invention provides the preform member bonding method of bonding a preform member and another member with an adhesive in an RTM process. The preform member bonding method includes increasing the viscosity of the adhesive by heat-treating only the adhesive in advance before inserting the adhesive between the bonding surfaces of the preform member and the other member. For this reason, pre-heating in the RTM process, that is to say, heating before and during resin impregnation, makes it possible to prevent the preform member from not being impregnated with resin as a result of the entry of the adhesive into the preform member in the workpiece, and to prevent a decrease in the bonding strength of the adhesive. Consequently, the strength of a workpiece can be secured.

DESCRIPTION OF EMBODIMENTS

Descriptions will be hereinbelow provided for a preform member bonding method of an embodiment of the present invention by use of the drawings.

EMBODIMENTS

The preform member bonding method of the embodiment of the present invention will be described using FIGS. 1 to 4.

Figure 1:
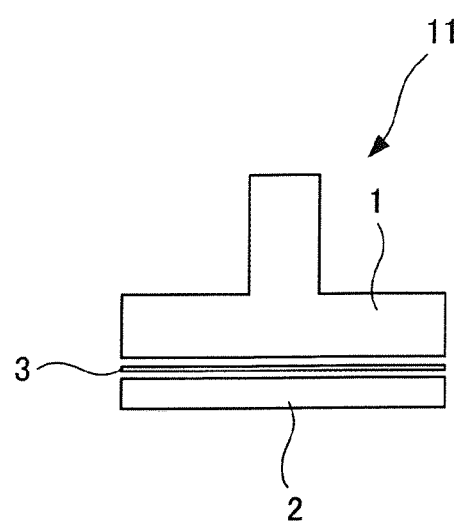
FIG. 1 is a schematic diagram of a workpiece including: a preform member shaped like the letter T; a hardened member; and an adhesive interposed between the two members.

FIG. 1 is a schematic diagram of a workpiece 11 including: a T-shaped preform member 1; a hardened member 2;

and an adhesive 3 inserted between the two members. The following description will be provided citing a case where a VaRTM process, which is a variation of a RTM process, is performed on such a workpiece 11.

The preform member bonding method of the embodiment of the present invention includes increasing viscosity of the adhesive 3 by heat-treating only the adhesive 3 in advance before inserting the adhesive 3 between bonding surfaces of the preform member 1 and the hardened member 2.

Figure 2:
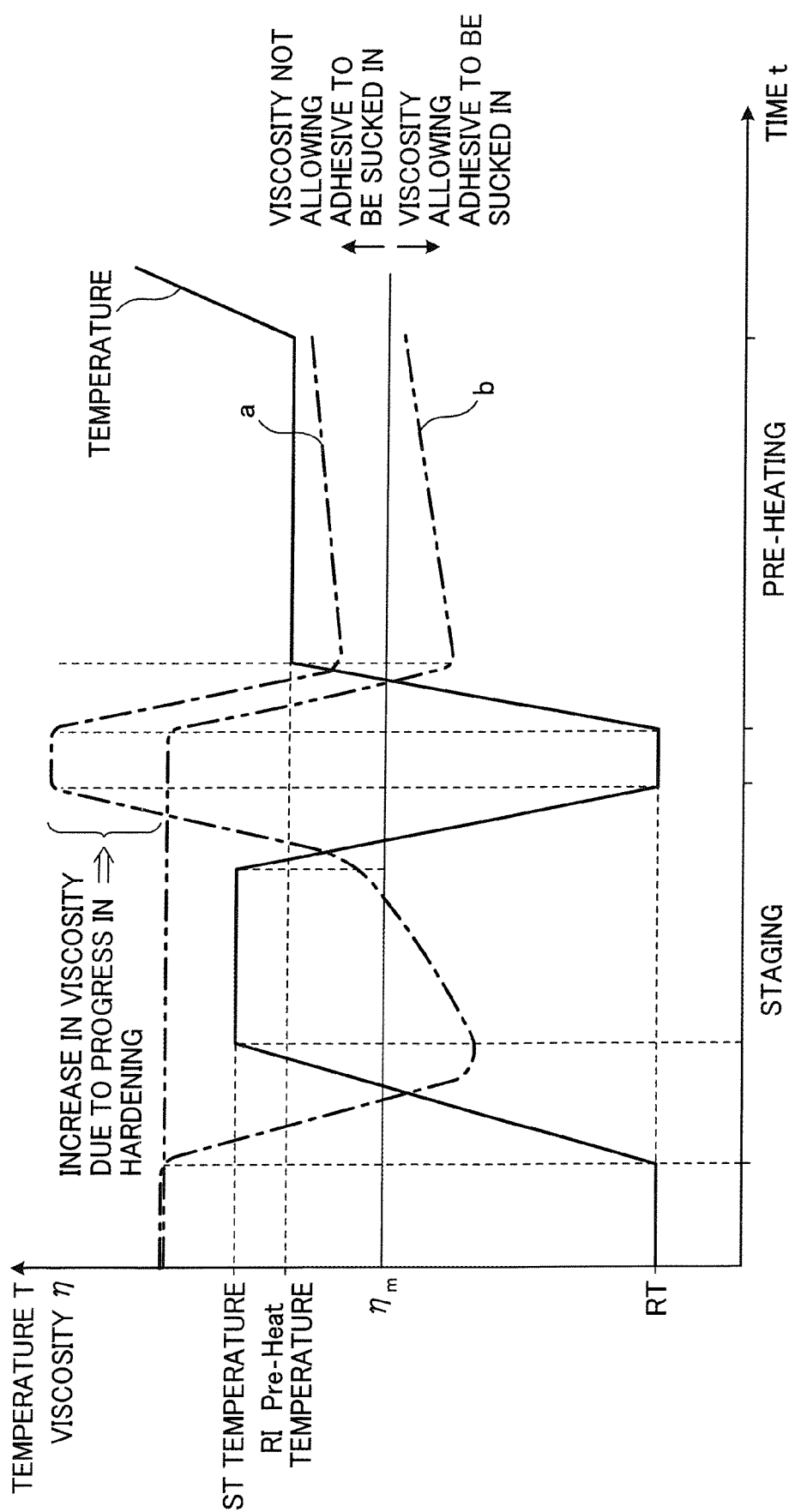
FIG. 2 is a graph showing how viscosity of the adhesive changes while heated before or during resin impregnation in a vacuum-assisted resin transfer molding (VaRTM) process.

FIG. 2 is a graph showing how the viscosity of the adhesive 3 changes while heated before or during resin impregnation in the VaRTM process. The vertical axis represents viscosity η and temperature T, while the horizontal axis represents time t. In addition, a "ST temperature" on the vertical axis means a temperature set for a staging step, while a "RI Pre-Heat temperature" on the vertical axis means a temperature set for a pre-heating step.

The "staging" is a step of beforehand heat-treating the adhesive 3 as placed in a bond area of a hardened member. No preform member 1 is included in the workpiece 11 yet. Meanwhile, the "pre-heating" is a step of, as described above, heating before or during the resin impregnation. The preform member 1 is included in the workpiece 11. In the graph, a curve a represents the change in the viscosity of the adhesive 3 which has been heat-treated in advance as described above, while a curve b represents the change in the viscosity of the adhesive 3 which has not been heat-treated in advance.

In the case where no staging is performed on the adhesive 3, as shown by the curve b, the viscosity η of the adhesive 3 during the pre-heating step becomes lower than a lower limit value (denoted by reference sign $η_m$ in FIG. 2) at which the adhesive 3 starts not being sucked into the preform member 1. As a result, the adhesive 3 is sucked into the preform member 1.

In contrast, in the case where the staging is performed on the adhesive 3, the viscosity of the adhesive 3 already becomes higher to a certain extent before the pre-heating step, as shown by the curve a in FIG. 2. Thus, the viscosity η of the adhesive 3 during the pre-heating step will not become lower than the lower limit value (denoted by reference sign $η_m$ in FIG. 2) at which the adhesive 3 starts not being sucked into the preform member 1. Consequently, no adhesive 3 is sucked into the preform member 1. The reason for this is that although the staging decreases the viscosity η of the adhesive 3 temporarily, the subsequent progress in the hardening of the adhesive 3 raises the viscosity η of the adhesive 3.

Figure 3:
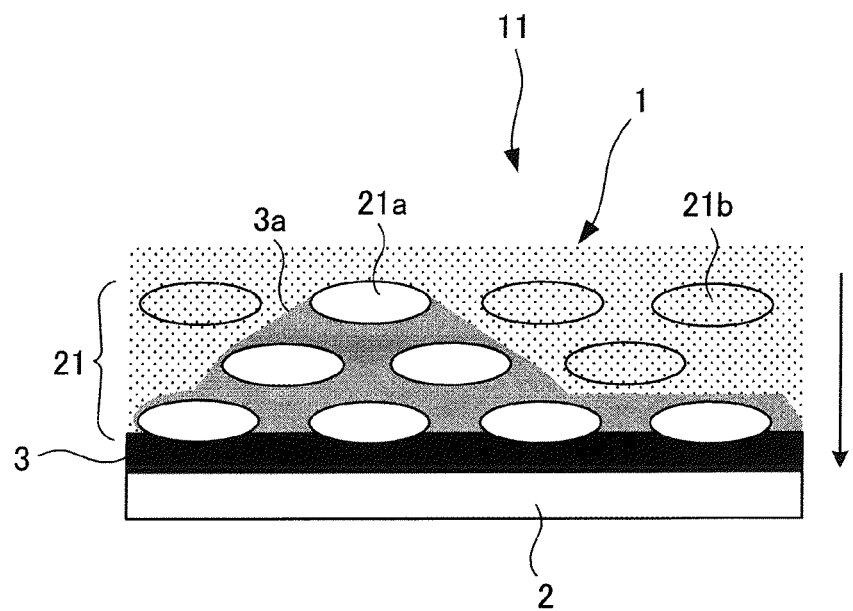
FIG. 3 is a schematic diagram for explaining how resin impregnation occurs when an RTM process is performed on a workpiece which uses the adhesive not having been heat-treated in advance.

FIG. 3 is a schematic diagram for explaining how the resin impregnation occurs when the VaRTM process is performed on the workpiece 11 which uses the adhesive 3 not having been heat-treated in advance. A dotted area in the diagram represents part of the preform member which is impregnated with the resin.

As shown in FIG. 3, the preform member 1 includes multiple fiber strands 21. The heating before or during the resin impregnation in the VaRTM process makes the adhesive 3 sucked into the preform member 1, as described above. A thus-sucked adhesive 3a covers the surfaces of some fiber strands 21a.

If while the preform member 1 is in this condition, the resin spreads in an arrow-indicated direction in FIG. 3, fiber strands 21b existing in a part of the preform member 1 into which no adhesive 3a enters are impregnated with the resin, while the fiber strands 21a whose surfaces have been covered with the sucked-in adhesive 3a will not be impregnated with the resin. That is to say, some part of the preform member 1 will not be impregnated with the resin. Incidentally, the adhesive 3a also only covers the surfaces of the fiber strands 21a, but does not enter the fiber strands 21a. Thus, the strength is not secured sufficiently.

In contrast, in the case where the adhesive 3 has been heat-treated in advance as described above, the heating before or during the resin impregnation in the VaRTM process temporarily decreases the viscosity η of the adhesive 3, but the viscosity η of the adhesive 3 will not become lower than the lower limit value $η_m$. Consequently, it is possible to prevent the adhesive 3 from being sucked into the preform member (although conditions for the heat treatment to be performed in advance for the purpose of not allowing the viscosity η of the adhesive 3 to become lower than the lower limit value $η_m$ need to be obtained from experimental data and the like).

Figure 4:
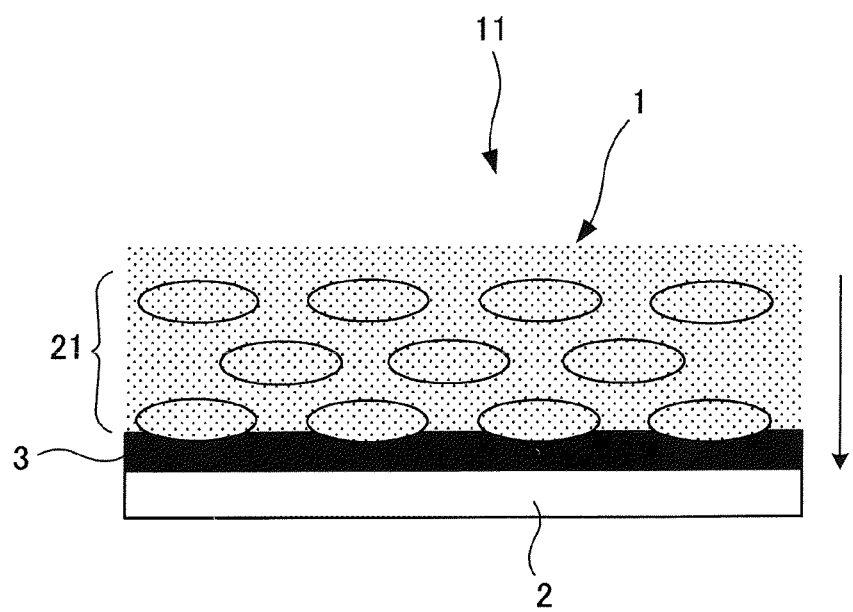
FIG. 4 is a schematic diagram for explaining how the resin impregnation occurs when the RTM process is performed on the workpiece which uses the adhesive having been heat-treated in advance.

FIG. 4 is a schematic diagram for explaining how the resin impregnation occurs when the VaRTM process is performed on the workpiece 11 which uses the adhesive 3 having been heat-treated in advance. A dotted area in the diagram represents part of the preform member which is impregnated with the resin.

As shown in FIG. 4, the heating before or during the resin impregnation in the VaRTM process prevents the adhesive 3 from being sucked into the preform member 1, as described above. Unlike in the case shown in FIG. 3, no adhesive 3 will cover the surfaces of the fiber strands 21. While in this state, if the resin keeps entering the preform member 1 in an arrow-indicated direction, all the fiber strands 21 in the preform member 1 will be impregnated with the resin.

The preform member bonding method of the embodiment of the present invention makes it possible to secure the strength of the workpiece by, as described above, preventing the preform member from not being impregnated with the resin.

It should be noted that although the foregoing descriptions have been provided using the case where the adhesive 3 is used to bond the preform member 1 and the hardened member 2 together, the present invention is not limited to this case. The present invention is applicable to any case where the adhesive 3 is used to bond the preform member 1 and another member (another preform member or the like) together. Furthermore, although the foregoing descriptions have been provided using the case where the preform member 1 is shaped like the letter T, it is a matter of course that the shape of the preform member 1 is not limited to that of the embodiment.

INDUSTRIAL APPLICABILITY

The present invention is preferable as a preform member bonding method in the RTM process.

REFERENCE SIGNS LIST

1 PREFORM MEMBER
2 HARDENED MEMBER
3 ADHESIVE
3a ADHESIVE (SUCKED INTO PREFORM MEMBER 1)
11 WORKPIECE
21 FIBER STRAND
21a FIBER STRAND (WHOSE SURFACE IS COVERED WITH ADHESIVE 3a)
21b FIBER STRAND (INTO WHICH NO ADHESIVE 3a ENTERS)

The invention claimed is:

1. A preform member bonding method of bonding a preform member and another member with an adhesive in resin transfer molding, comprising
   a staging step of beforehand heat-treating only the adhesive to reach a ST temperature so as to progress hardening of the adhesive before inserting the adhesive between bonding surfaces of the preform member and the other member,
   a temperature lowering step of lowering a temperature of the adhesive to a temperature lower than the ST temperature, and
   a pre-heating step of heat-treating the preform member together with the adhesive to reach and hold at a pre-heat temperature lower than the ST temperature after inserting the adhesive between bonding surfaces of the preform member and the other member, wherein
   the temperature of the adhesive lowered in the temperature lowering step is lower than the pre-heat temperature.

2. A preform member bonding method comprising:
   a staging step of beforehand heat-treating an adhesive, which is placed in a bond area of a hardened member, to reach a ST temperature so as to progress hardening of the adhesive;
   a temperature lowering step of lowering a temperature of the adhesive to a temperature lower than the ST temperature, and
   a pre-heating step of heat-treating the preform member together with the adhesive to reach and hold at a pre-heat temperature lower than the ST temperature after placing a preform member on the heat-treated adhesive, wherein
   the temperature of the adhesive lowered in the temperature lowering step is lower than the pre-heat temperature.

3. A composite material producing method comprising:
   a staging step of beforehand heat-treating an adhesive, which is placed in a bond area of a hardened member, to reach a ST temperature so as to progress hardening of the adhesive;
   a temperature lowering step of lowering a temperature of the adhesive to a temperature lower than the ST temperature, and
   a pre-heating step of heat-treating the preform member together with the adhesive to reach and hold at a pre-heat temperature lower than the ST temperature before or during resin impregnation after placing a preform member on the heat-treated adhesive, wherein
   the temperature of the adhesive lowered in the temperature lowering step is lower than the pre-heat temperature.

* * * * *